(12) United States Patent
Earley

(10) Patent No.: US 9,256,080 B2
(45) Date of Patent: *Feb. 9, 2016

(54) RECEPTOR AND LOCK FOR GLASSES WITH REMOVABLE LENSES

(71) Applicant: William J. Earley, Watkinsville, GA (US)

(72) Inventor: William J. Earley, Watkinsville, GA (US)

(73) Assignee: Tifosi Optics Inc., Watkinsville, GA (US)

(*) Notice: Subject to any disclaimer, the term of this patent is extended or adjusted under 35 U.S.C. 154(b) by 44 days.

This patent is subject to a terminal disclaimer.

(21) Appl. No.: 14/084,216

(22) Filed: Nov. 19, 2013

(65) Prior Publication Data

US 2014/0078461 A1 Mar. 20, 2014

Related U.S. Application Data

(63) Continuation-in-part of application No. 13/291,929, filed on Nov. 8, 2011, now Pat. No. 8,613,515.

(51) Int. Cl.
*G02C 7/02* (2006.01)
*G02C 1/08* (2006.01)
*G02C 5/14* (2006.01)
*G02C 1/02* (2006.01)
*G02C 5/10* (2006.01)

(52) U.S. Cl.
CPC *G02C 1/08* (2013.01); *G02C 1/023* (2013.01); *G02C 5/10* (2013.01); *G02C 5/14* (2013.01); *G02C 7/02* (2013.01); *G02C 2200/04* (2013.01); *G02C 2200/08* (2013.01)

(58) Field of Classification Search
CPC ... G02C 7/02; G02C 2200/06; G02C 2200/08
USPC .................................. 351/103, 110, 159.01
See application file for complete search history.

(56) References Cited

U.S. PATENT DOCUMENTS

| 7,887,181 | B1* | 2/2011 | Chen | 351/57 |
| 8,613,515 | B2* | 12/2013 | Earley | 351/110 |
| 2008/0186445 | A1* | 8/2008 | Van Atta et al. | 351/103 |
| 2010/0053545 | A1* | 3/2010 | Takeshi | 351/110 |
| 2010/0271586 | A1* | 10/2010 | Hadehara | 351/140 |

* cited by examiner

*Primary Examiner* — Darryl J Collins
(74) *Attorney, Agent, or Firm* — Smith Risley Tempel Santos LLC; Gregory Scott Smith

(57) ABSTRACT

A glasses structure that receives a variety of lens element types including full-frame, half-frame and frameless lens elements. A temple that receives a connector on the lens element includes a kerf-like slotted spring lock, that releases under pressure to allow the insertion of the lens element and once inserted, provides sufficient force to retain the lens element in position even during athletic activity. The lock includes an interior space that includes latches. The lens element includes catches and detents that correspond to the latches. In operation, the lock is forced into the open position as the catches of the lens element are forced to the backside of the latches, and as the lock closes, the latches are forced into the detents thereby securing the lens to the lock.

22 Claims, 14 Drawing Sheets

FIG. 2B (B-B)

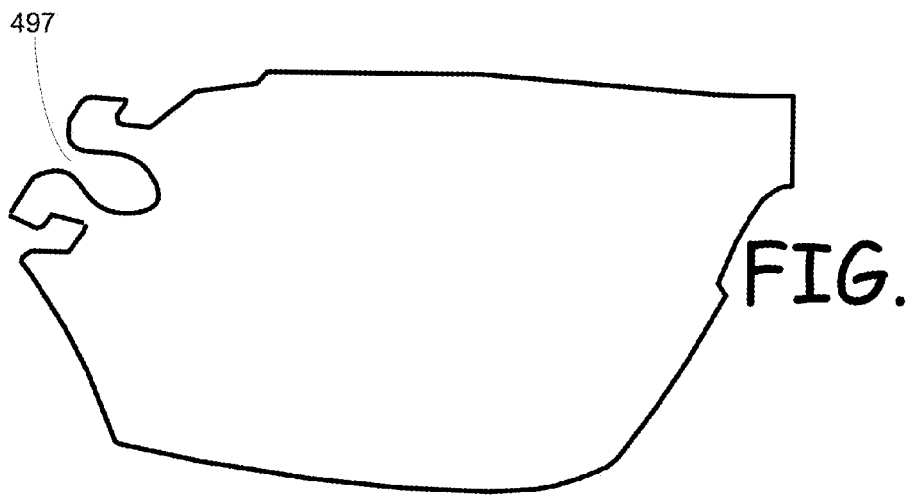
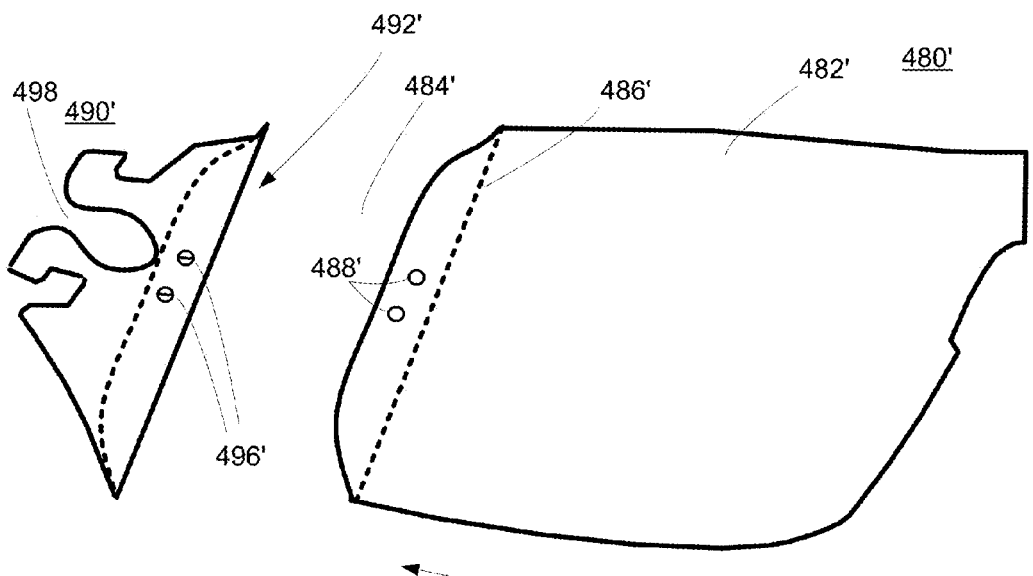

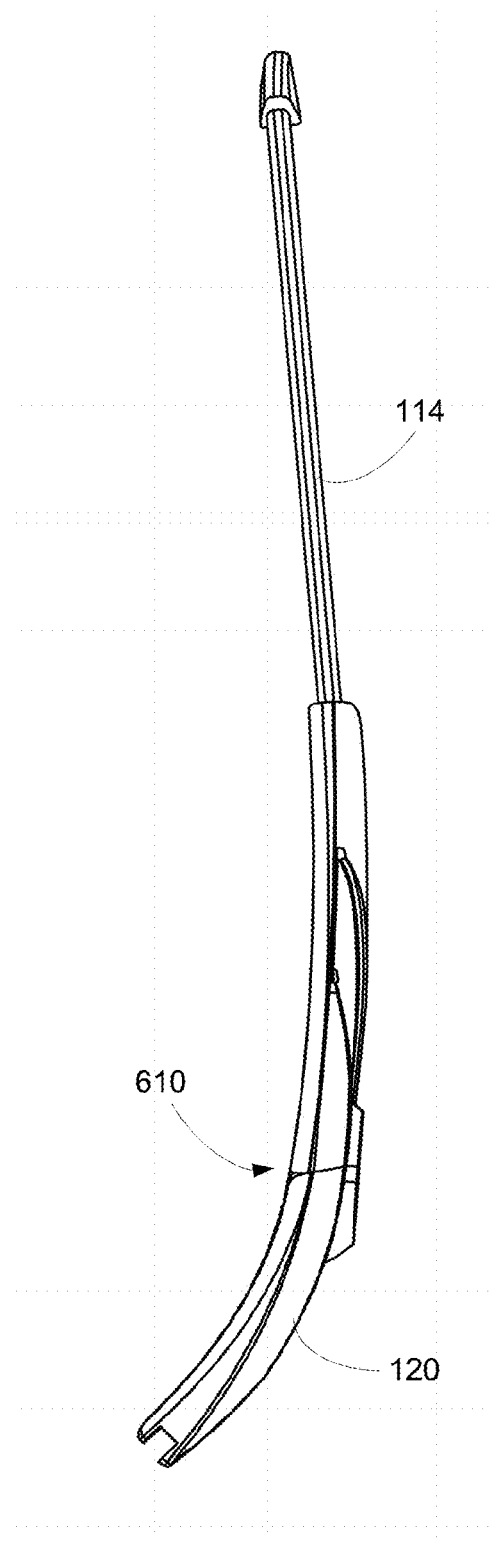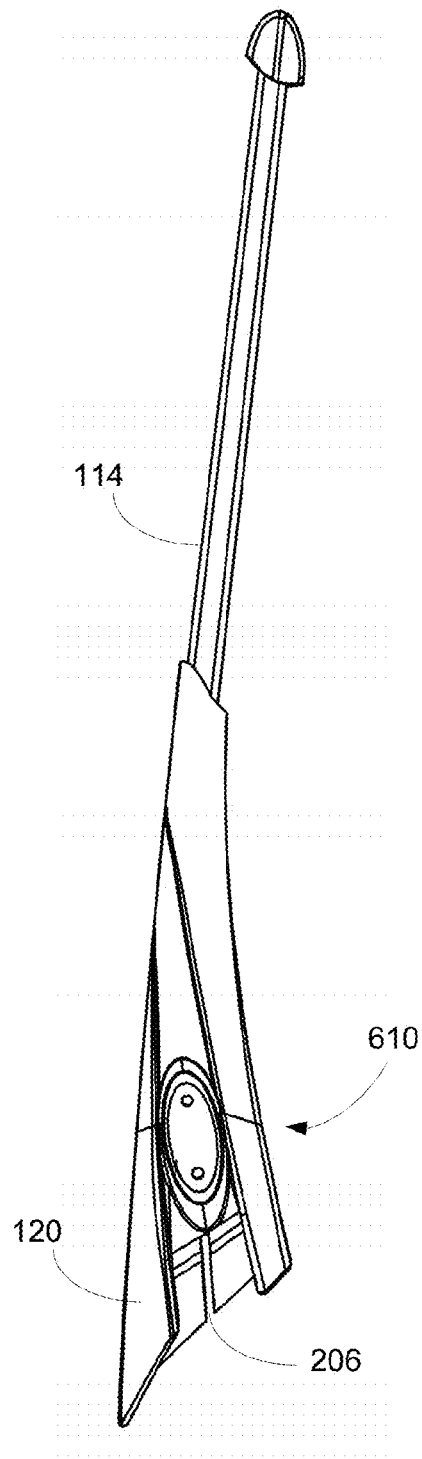
FIG. 6A
FIG. 6B

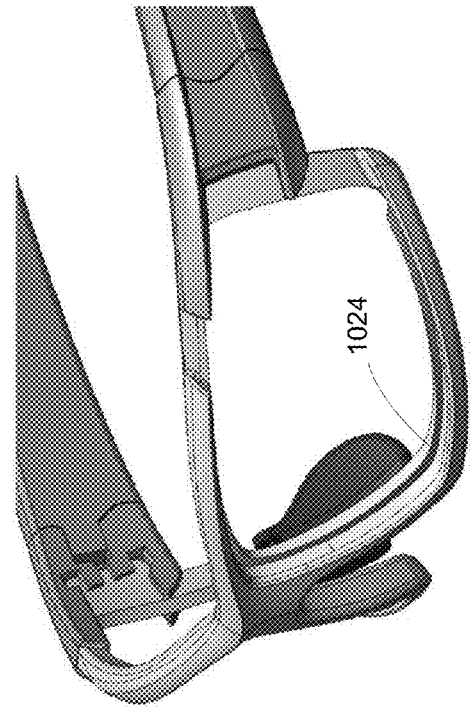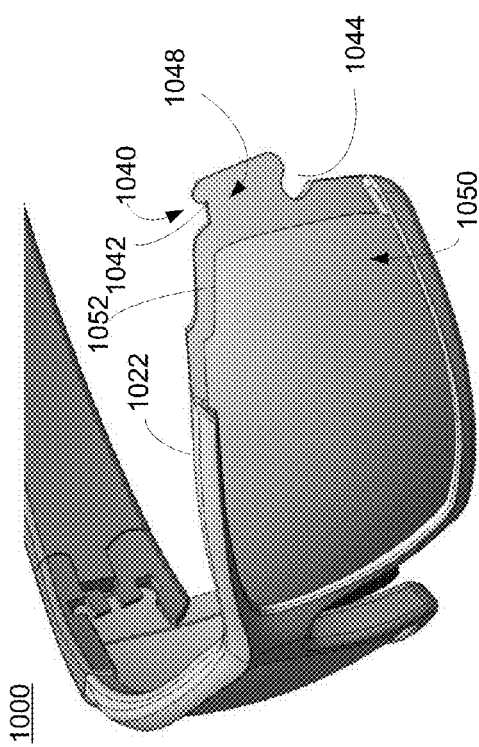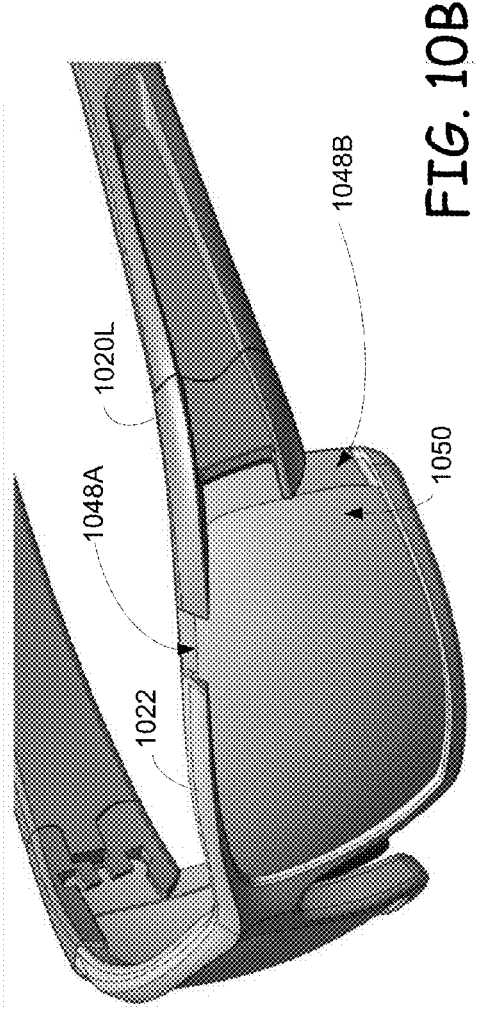

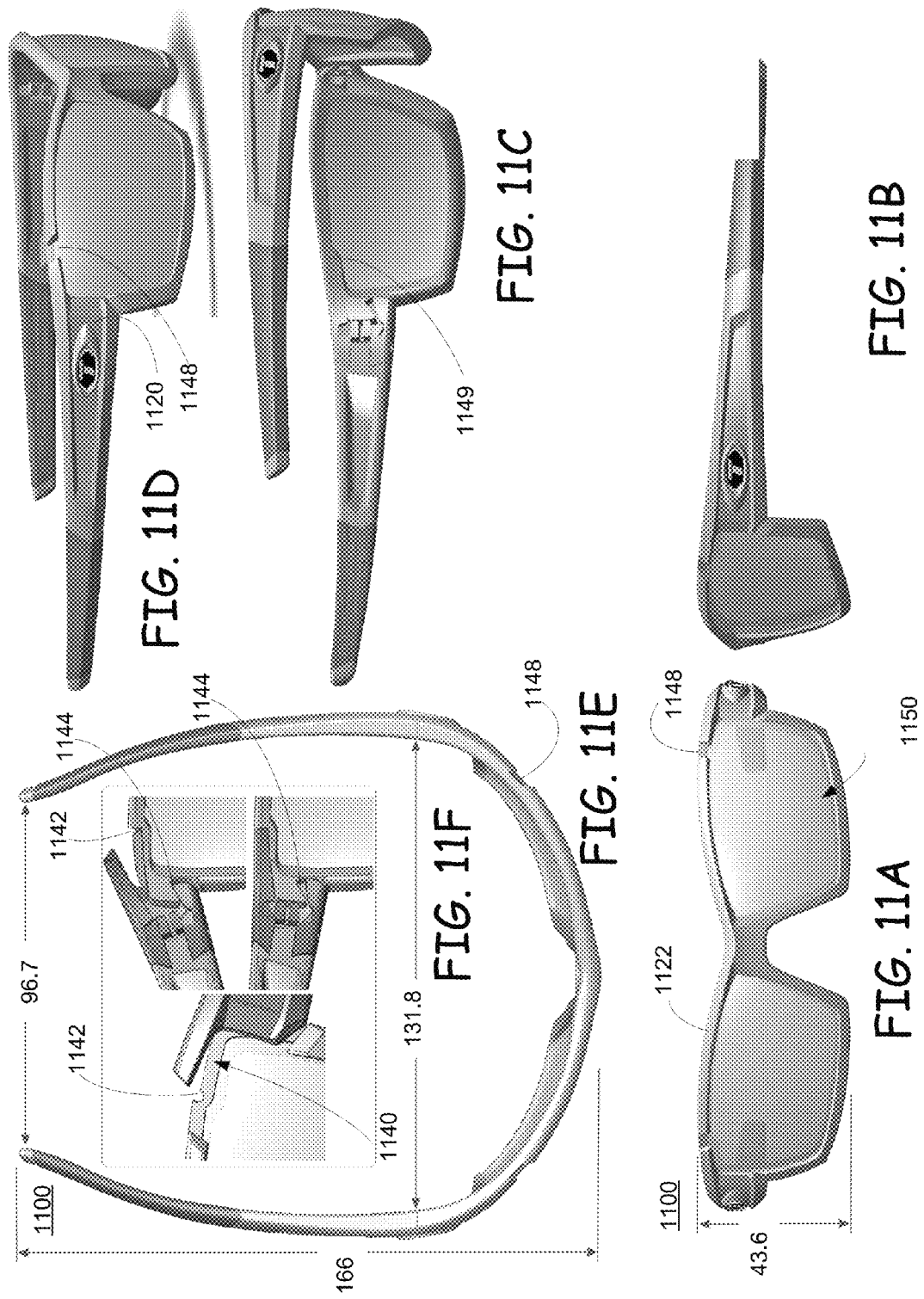

RECEPTOR AND LOCK FOR GLASSES WITH REMOVABLE LENSES

CROSS-REFERENCE TO RELATED APPLICATIONS

This application is being filed under 35 USC 111 and 37 CFR 1.53(b) as a continuation-in-part application of the United States application for patent that was filed on Nov. 8, 2011 and assigned Ser. No. 13/291,929, which application, along with all of its exhibits is incorporated herein by reference. This application is related to the following United States Design Applications for patent for patent that are filed on the same date at this application, under customer number 35856: each of these applications are incorporated herein in their entirety.

BACKGROUND

The present disclosure relates to structures for eyeglasses and sunglasses with interchangeable or removable lenses, and more particularly, to a frame and/or a receptor that can be incorporated into a frame, that receives a lens or lenses and retains the same by employing a relief mechanism, such as a kerf-like slotted springing lock.

One of the early runners in the history of sunglasses were the Inuit sun goggles made from bone, wood or hammered out seal skins and included a slit across the front to minimize the amount of light that would reach the eyes. Eyeglass and sunglass technology has advanced considerably since this time. In addition, as eyeglasses and sunglasses have been incorporated into the arena of competitive sports, where hundredths of seconds can mean the difference between a gold medal or cup of GATORADE, the precision, durability and usability of the products has greatly increased the price—although one may argue from the perspective of the animal that donated its bones to the Inuits that the price has actually gone down.

With the increase in precision, durability and price that has occurred during these technological advancements, the inventive spirit was aroused in the development of multi-purpose equipment. Initial advancements in this area included the clip-on sunglasses that allowed quick conversion between eyeglasses and sunglasses. Such advancements were quickly followed by flip-up sunglasses, shutter shades, gradient lenses and interchangeable lenses. The advantage of each of these innovative products is that a single product can be used for a variety of purposes. However, from a sporting perspective, each of these solutions has one or more pitfalls.

The present disclosure presents embodiments that provide a new, innovative solution that provides versatility in, and cost effectiveness for a multi-purpose solution for glasses.

BRIEF SUMMARY

The present disclosure presents various embodiments, and aspects, functions and features thereof, of a frame for eyeglasses or sunglasses, and/or a receptor that can be incorporated into such a frame, and that is suitable for receiving and holding inserted lenses. Further, the present disclosure presents embodiments of interchangeable lenses that can be utilized in conjunction with various embodiments of the frame and/or receptor. More specifically, the present disclosure presents a receptor design for incorporating into a glasses frame that includes a relief-locking mechanism. The relief allows the receptor to open when receiving a lens element and then close and lock the lens element into position. In an exemplary embodiment, the relief-locking mechanism may include a kerf-like slotted spring lock. The kerf-like slotted spring lock releases under pressure to allow the insertion of a lens element and once inserted, provides sufficient force to retain the lens element in position even during athletic activity. The lock receives a portion of a lens element into an interior space that includes one or more latches to hold or lock the lens element into place. It should be appreciated that the term lock is being used to describe the securing of the lens element to the receptor in a manner to hold the lens in position under normal use conditions. The kerf-like slots in the walls of the receptor enable the lock to be forced open thereby allowing the insertion of the connector of the lens element. The lens element has a connection element that includes one or more catches and detents that correspond to the one or more latches in the receptor. In operation, the lock is forced into the open position as the catches of the lens are forced into the receptor and to the backside of the latches, and as the lock closes, the latches are forced into the detents thereby securing the lens to the lock.

In one embodiment, a glasses kit with interchangeable lens elements is provided. The glasses include two stems and one or more lens elements. The stems include a temple element that houses the interface for and receives the connector of the lens element. The kit may include one or more of the following lens elements: a full-frame lens element wherein the connector is defined by the frame of the full-frame lens element, a half-frame lens element wherein the connector is defined at least partially by the frame and at least partially by the lens and, a frameless lens element wherein the connector is defined by the lens.

In the full-frame embodiments, the frame may include a slot there through to allow the frame to be forced open or widened for receiving a lens.

These and other embodiments and elements are further described in the detailed description of the various embodiments.

BRIEF DESCRIPTION OF THE SEVERAL VIEWS OF THE DRAWING

FIGS. 2A-2G, collectively referred to as FIG. 2, illustrates various views of an exemplary hinge element incorporating an exemplary embodiment of the kerf-like slotted spring lock.

FIG. 2A illustrates an inside side view of a hinge element incorporating one embodiment of the kerf-like slotted spring lock.

FIG. 2B (B-B) is a cross-sectional view of the hinge element illustrated in FIG. 2A taken at line B-B.

FIG. 2C is a top-side view of the hinge element illustrated in FIG. 2A.

FIG. 2D is a bottom side view of the hinge element illustrated in FIG. 2A.

FIG. 2E is a perspective view of the temple end of the hinge element illustrated in FIG. 2A.

FIG. 2F is a perspective view of the lens end of the hinge element illustrated in FIG. 2A.

FIG. 2G illustrates an outside side view of the hinge element of FIG. 2A.

FIG. 4H illustrates another variation that can be included in other embodiments including a relief mechanism on a lens.

FIG. 4I also illustrates the incorporation of a relief mechanism into a two-piece lens structure in which the lens connector can be attached to the lens.

FIG. 6A is a top plan view of an exemplary temple attached to an exemplary hinge lock structure.

FIG. 6B is a side elevation view of the exemplary temple attached to the exemplary hinge lock structure illustrated in FIG. 6A.

FIG. 10A, FIG. 10B and FIG. 10C illustrate yet another embodiment of glasses that incorporate the attachable capabilities.

FIG. 11A is a front elevation view of the glasses 1100 that include the lenses 1150 and a frame 1122.

FIG. 11B is a side elevation view of the glasses 1100.

FIG. 11C is a perspective view of the glasses 1100 taken from an underside view.

FIG. 11D is a perspective view of the glasses 1100 taken from a front-side view.

FIG. 11E is a top plan view of the sunglasses 1100.

FIG. 11F provides several views of a close-up of the temple 1120 and the interface with the connector element 1140.

DETAILED DESCRIPTION OF EMBODIMENTS

The present disclosure presents various embodiments, as well as features, aspects and elements that can be incorporated into the various embodiments, of a receptor that includes a relief mechanism for receiving and then securing of a lens, frame and/or lens/frame combination (collectively referred to as lens element) in the receptor. Further, the present disclosure presents various embodiments of such a receptor including an embodiment in which the relief mechanism includes a kerf-like slotted spring lock for receiving a lens element, a frame employing such lock and a lens element suitable for insertion in such lock.

Figure 1:
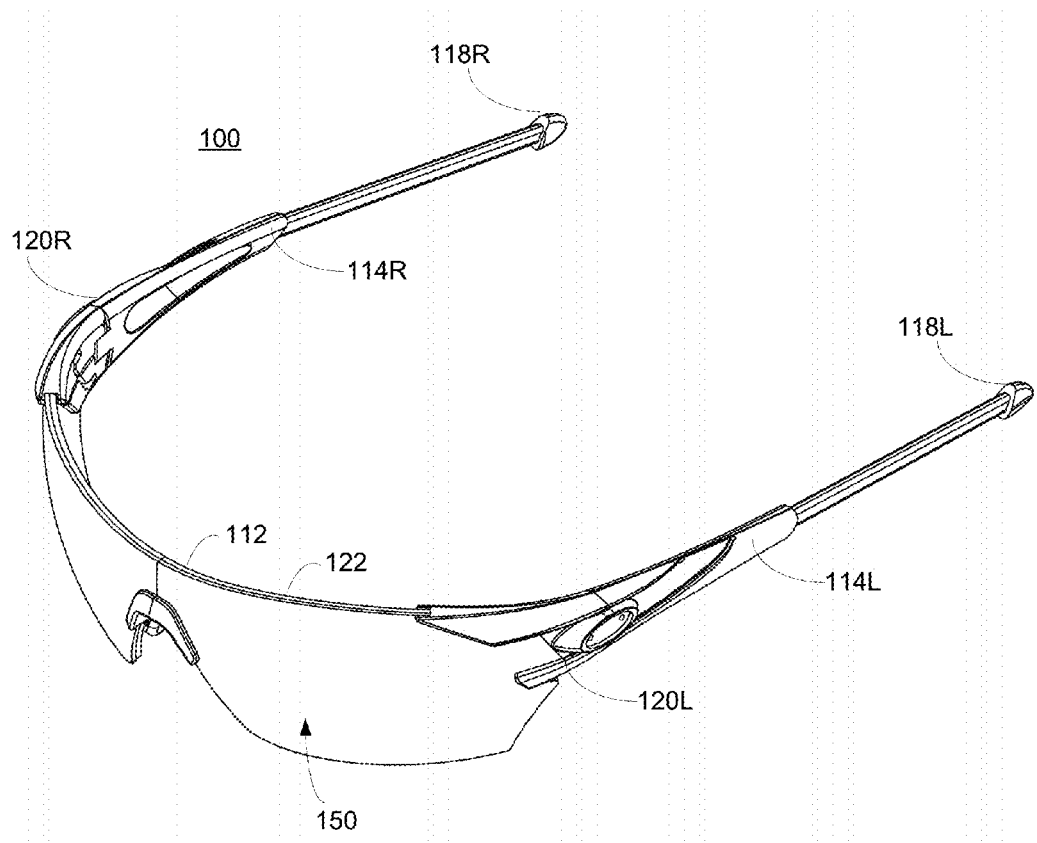
FIG. 1 is a perspective view of a pair of glasses with a lense and frame that is a suitable environment for and/or represents an exemplary embodiment of the glasses frame with a kerf-lie slotted spring lock for receiving a lens.

FIG. 1 is a perspective view of a pair of sunglasses with lens(es) and a frame that is a suitable environment for and/or represents an exemplary embodiment of the glasses frame with a kerf-like slotted spring lock for receiving a lens. FIG. 1 illustrates a pair of sunglasses, or eye glasses, 100 that includes a frame 110 and lens(es) 150. It should be appreciated that within this disclosure, the term glasses will be used to refer to any form of glasses including eyeglasses, reading glasses, sunglasses, protective glasses, sportswear glasses, goggles, or the like. In the illustrated embodiment, the glasses frame 110 includes a bridge 112, a set of ear stems 114L and 114R on the left and right side of the frame 110 respectively, tips 118L and 118R on respective ends of the ear stems 114L and 114R, and temples 120L and 120R which serve as the connection between the ear stems 114L and 114R and a rim 122 and/or lens 150. It should be appreciated that in some embodiments, the rim 122 is used to hold the lens in place and as such, the rim may take on a variety of forms such as a full frame, half frame or split frame. However, many glasses are structured as rimless glasses. Rimless glasses basically include a technique for the lens or lenses to be mounted to the temples and the lens either spans the front of the glasses as a unitary lens from temple to temple or, utilizes the bridge or rim to serve as a middle connection between split or two piece lenses (dual lenses). Although in some embodiments of glasses, the temples include a hinge element and hence are referred to as hinges rather than temples. Throughout this disclosure, the portion of the frame 110 that is proximate to the end of the ear stem 114L and 114R that is distal from the tip 118L and 118R will generally be referred to as the temple element, regardless of whether the glasses include or do not include a hinge. Thus, the term temple is used to identify the portion of the frame that either connects to the rim 122 and/or directly to the lenses 150, and connects to the arms or ear stems 112.

In one embodiment of the kerf-like spring lock, the lock operates as a receptor, which can be incorporated into the temple element of a pair of glasses. The receptor includes a housing that is constructed of an inside wall and an outside wall. For purposes of illustration, the inside wall is the wall that is located on the inside of the frame of the glasses (the side that is facing or proximate to the wearer's face) and the outside wall faces away from the wearer or is distal to the wearer's face. The inside and outside walls cooperate to define an interior space or a void for receiving a connection element of a lens element. Further, at least one latch is located within the interior space. The surface or contour of the lens element defines a detent proximate to the connection element of the lens element. When the connection element is placed within the interior space of the receptor, the latch aligns with the detent to help secure the lens element into position. Further, embodiments may include a second latch on the interior of the receptor and the lens element can define a second detent for further securing the lens element into position.

In various embodiments, the temple element with the included lock or receptor includes a stem receiving end at which an ear stem can be attached, and a lens receiving end. However, in other embodiments, it will be appreciated that the temple element is integral to the stem and as such, is a unitary piece rather than two pieces that connect together. The edges of the inside wall and the outside wall at the lens receiving end of the temple, or stem/temple, cooperate to define an opening into the void for receiving the connection element of the lens element. Further, at least one of the inside and outside housing walls includes at least one relief mechanism, such as a kerf-like slot. For instance, the kerf-like slot can run from the edge of the wall on the end that receives the lens element, and substantially in the direction of the stem end of the temple element. The length, width and shape of this kerf-like slot can vary among embodiments but in an exemplary embodiment, the length of the slot may range from approximately ¼ of the length of the housing or temple element to ¾ or more of the length of the housing. Further, in an exemplary embodiment the width of the slot may range from ¹⁄₁₆ to ¼ of an inch. However, in other embodiments, other distances and widths are also anticipated. In general, the kerf-like slot is configured such that it enables an upper portion of the wall to be moved in the opposite direction from a lower portion of the wall thereby increasing the size of the opening into the void. However, it will be appreciated that in other embodiments, other movements of the various elements of the temple may be moveable in other directions to enable the entry of the lens element.

In various embodiments, the housing of the receptor is configured such that, upon placement of the connecting element of the lens element into the void and causing one of the latches to be forced towards a lens detent, a force can be applied to the lens in the direction of the other latch to cause a catch on the lens to come in contact with the other latch and force the upper portion of the wall to be moved in an opposing direction from a lower portion of the wall thereby increasing the size of the opening into the void.

Other embodiments include a glasses frame that includes a receptor for receiving and securely retaining lenses, while still allowing the lens(es) to be removed and/or replaced by other lenses. Thus, lenses with varying tints, varying colors, varying shapes, varying prescriptions, etc., can be inserted into the same frame. The frame includes two arm elements or ear stems and two temple elements (either separate elements or each ear stem and temple element can be integral to each other). Each of the temple elements in the two-piece embodiments includes an ear stem interface and a lens interface on the opposing end of the temple element from the ear stem interface. The ear stem elements are attached to the ear stem interface of the temple element. The glasses further include a bridge and one or more lens elements. The lens element, which may include one lens to cover both eyes (unitary lens) or two lenses (dual lenses), one for each eye, includes a connecting portion corresponding to each of the temple elements. Thus, in typical embodiments, a unitary lens will include two connecting portions, where as the use of two lenses will have at least a single connecting portion on each lens.

In some embodiments, each temple element includes a first exterior wall and a second exterior wall that cooperatively define an interior space and an opening into the interior space, and wherein the interior space includes at least two latches. The connecting portion of the lens element includes at least two catches with each catch corresponding to one of the at least two latches in the temple element. Further, the connecting portion also includes or defines at least one detent associated with one of the catches. Upon placement of a first catch of the connecting portion through the opening and towards the first latch, pressure can be applied to the lens element to force the second catch toward a second latch. When the second catch contacts the second latch, this force causes the displacement of the second latch relative to the first latch, such that the second catch can pass to the back side of the second latch thereby allowing the second latch to enter the detent and securing or locking the lens element to or within the temple element. To further facilitate the movement of the latches relative to each other, one or more walls of the temple element may include a relief mechanism, such as a kerf-like slot or other mechanisms. The kerf-like slot can take on a variety of forms, and in one embodiment it includes a lateral slot that begins at the edge of the lens element interface of an exterior wall of the temple element and extends towards the ear stem end of the temple element. Further, the kerf-like slot may include a vertically oriented slot, such as being substantially perpendicular to the lateral slot as a non-limiting example) and that intersects with the lateral slot. The intersection may take on the form of the two slots crossing each other or, may simply be an adjoining of one slot with the next in a "T" like configuration. Even further, the vertical slot of the kerf-like slot may include a hole or void that is substantially wider than the vertical slot.

FIGS. 2A-2G, collectively referred to as FIG. 2, illustrates various views of an exemplary temple element incorporating an exemplary embodiment of the kerf-like slotted spring lock. As is known in the art, a kerf is a slot, void or groove that is created in an object, such as a piece of wood or plastic, that enables the object to have a level of flexibility or displacement not otherwise available. For instance, including a series of side-by-side parallel kerfs in a piece of wood, the generally rigid structure of the piece of wood can actually be curved around a radius. The kerf-like slotted spring lock operates on the same principle as a kerf. In general, the temple element is designed such that in a steady state (i.e., no forces being exerted against the lock) the lock remains in a closed position and upon the application of a force, the lock can be temporarily displaced or forced open, such state lasting only as long as the force is present. The term kerf-like then is defined for purposes of this description as any aperture, slot, slit, opening, weakening, etc., whether cut, sawn, molded, etc., that is included in an object to allow portions of the object to be displaced or become more flexible and, maintaining a memory force to cause the object to return to a steady state of fail state when the forces causing the displacement are removed.

Figure 2C:
Figure 2G:
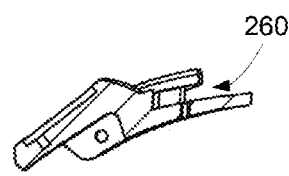
Figure 2G:
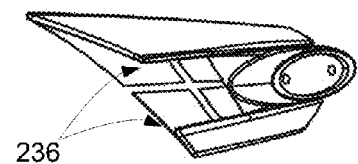
Figure 2E:
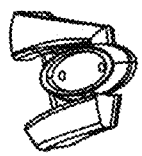
Figure 2A:
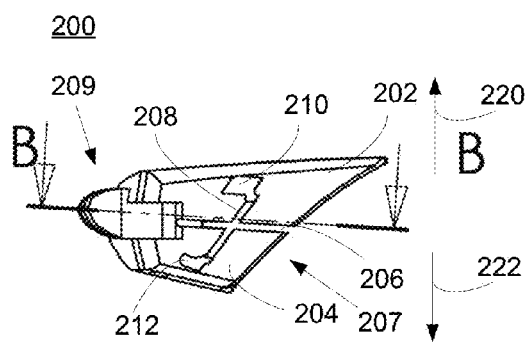

More particularly, FIG. 2A illustrates an inside side view of a temple element incorporating one embodiment of the kerf-like slotted spring lock (referred to as a "lock"). The inside side view refers to the side of the temple that faces the wearer's head when the glasses are being worn. The illustrated embodiment of the lock includes an upper portion 202 and a lower portion 204. The upper portion 202 and the lower portion 204 are partially segmented from each other by slot 206, which traverses substantially horizontally from a lens element 150 receiving end 207 of the temple element 200 towards the ear stem 114 receiving end 209 of the temple element 200. When no force is being applied to the upper portion 202 and/or the lower portion 204, the lock rests in the closed position as illustrated in FIG. 2A. However, upon the application of forces in the approximate directions of 220 and/or 222 to the upper portion 202 and/or lower portion 204 respectively, the upper portion 202 and the lower portion 204 are forced to move away from each other thereby widening the slot 206.

The mobility of the upper portion 202 and the lower portion 204 can be further increased by including a substantially vertically-oriented slot 208 in the wall of the temple element 200. The substantially vertically-oriented slot 208 is shown as running substantially perpendicular to slot 206 (although other orientations are also anticipated), with one end of slot 206 extending into the upper portion 202 and another end of the slot 206 extending into the lower portion 204. It should be appreciated that in some embodiments, only the single slot 206 is required. In other embodiments, both the slots 206 and 208 can be included wherein the slot 208 can exist in both the upper portion 202 and lower portion 204, or just in either the upper portion 202 or lower portion 204. Further, the orientation of the substantially horizontal slot 206 and substantially vertical slot 208 can vary from embodiment to embodiment and the illustrated configuration is simply one non-limiting example. The slots 206 and 208 are described herein as being kerf-like in that the existence of the slot allows the upper portion 202 and the lower portion 204 to move away and towards each other in a spring-hinged like fashion. However, rather than being cut into the surface of the hinge, the kerfs can be molded, cut, laser cut, or otherwise created in the hinge.

FIG. 2A further illustrates an enlarged void existing at each end of the substantially vertical slot 208. The upper void 210 exists within the upper portion 202 of the temple element 200 and the lower void 212 exists within the lower portion 204 of the temple element 200. The voids provide additional flexibility in the movement of the upper portion 202 and the lower portion 204 and/or operate to reduce the amount of force required to displace the upper and/or lower portions. The shape and size of the upper and lower void 210 and 212 can vary from embodiment to embodiment and are selected such that the force required to move the lock open is not excessive, yet the force required to displace the lock from its steady state is significant enough to avoid inadvertent openings of the lock.

Figure 3A:
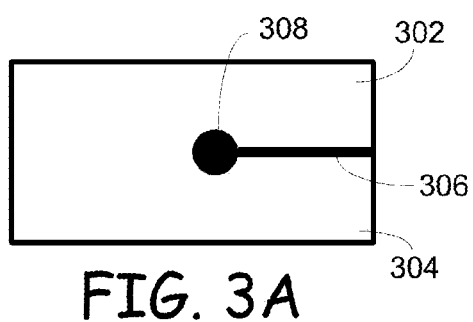
FIGS. 3A-3H illustrate a few non-limiting examples of kerf-like configurations.
Figure 3E:
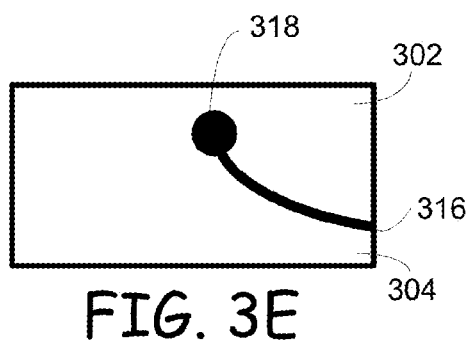
Figure 3B:
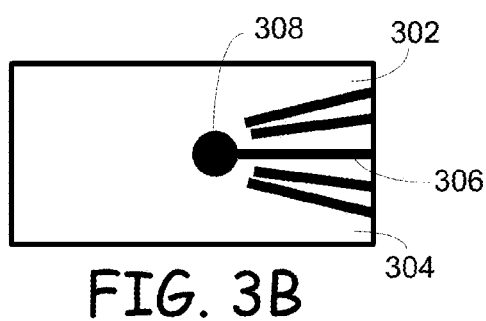
Figure 3F:
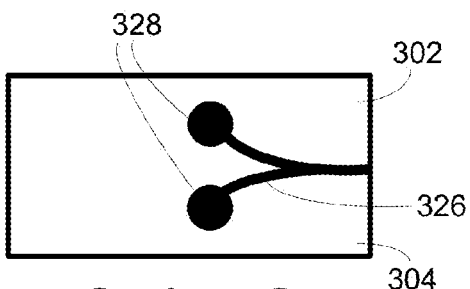
Figure 3C:
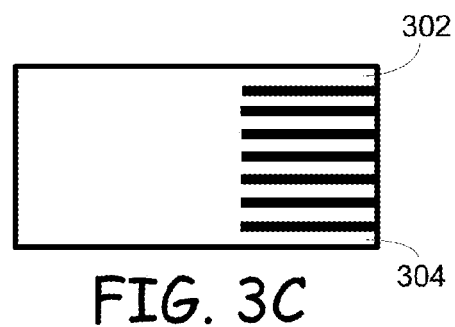
Figure 3G:
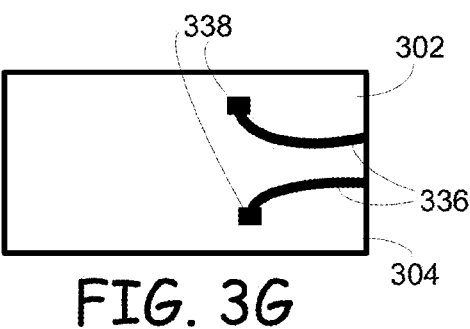
Figure 3D:
Figure 3H:
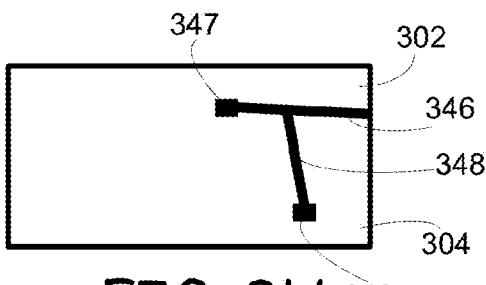

In other embodiments, various kerf-like configurations can be used to provide the necessary flexibility in the lock. FIGS. 3A-3H illustrate a few non-limiting examples of other kerf-like configurations that could be utilized in various embodiments. For instance, in FIG. 3A, a simple void 308 with a slot 306 extends from the lens edge of the hinge to the void. This configuration allows the upper portion 302 and the lower portion 304 to be forced apart with the void 308 and slot 306 operating as a spring like hinge. FIG. 3B includes additional kerf-like slots above and below the slot 306 to provide greater flexibility in the upper portion 302 and lower portion 304 relative to each other. FIG. 3C includes a series of seven (7) parallel kerfs that operate similar to normal kerf structures to allow the upper portion 302 and lower portion 304 to be forced apart. FIG. 3D is similar in structure to FIG. 3C with the exception that the kerfs are not parallel, but rather are positioned on the temple in a radial fashion. FIG. 3E is similar in structure to the structure illustrated in FIG. 3A with the exception that the slot 326 is curved from the lower portion 304 up towards a void 318 existing in the upper portion 302. FIG. 3F further modifies the structure of FIG. 3E by including two voids and two curved slots that meet at the lens edge of the temple element. FIG. 3G is a variation from FIG. 3F in that the curved slots 336 do not meet at the lens edge of the hinge but rather are located apart from each other. Further, the voids are illustrated as being rectangular to illustrate that the voids can have a variety of shapes. FIG. 3H illustrates yet another configuration in which a substantially horizontal slot 346 intersects with a substantially vertical slot 348 to form a "T" shape as in the TIFOSI OPTICS logo. The ends of the substantially horizontal slot 346 and the substantially vertical slot 348 terminate respectively at voids 347 and 349. It should be appreciated that the illustrated configurations are provided for the purpose of non-limiting examples only and that other configurations are also anticipated by the present disclosure.

Figure 2F:
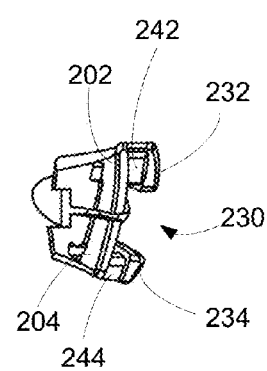
Figure 2D:
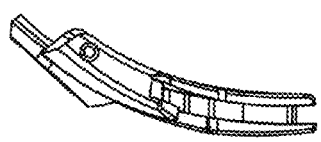

Returning again to FIG. 2, FIG. 2B (B-B) is a cross-sectional view of the temple element illustrated in FIG. 2A taken at line B-B. FIG. 2C is a top-side view of the temple element illustrated in FIG. 2A. FIG. 2D is a bottom side view of the temple element illustrated in FIG. 2A. FIG. 2E is a perspective view of the ear stem end of the temple element illustrated in FIG. 2A and FIG. 2F is a perspective view of the lens end of the temple element illustrated in FIG. 2A. FIG. 2G illustrates an outside side view of a temple element of FIG. 2A. Referring further to FIG. 2F, the lens end of the temple element 200 is illustrated as including an opening 230 that is defined by the upper portion 202 and the lower portion 204 of the inside side wall of the temple element, and corresponding upper portion 232 and lower portion 234 of the outside side wall of the temple element 200. In the illustrated embodiment, on the outside surface of the temple element 200, a large gap 236 is shown between the upper portion 232 and the lower portion 234 (best illustrated in FIG. 2G). The gap 236 further enables the movement of the upper portions 202 and 232 away from the lower portion 204 and 234. It should be appreciated that in some embodiments, both the outside wall and the inside wall may include kerf-like structures and in other embodiments, only one of the walls may include a kerf-like structure.

Still referring to FIG. 2F, inside the opening 230, positioned between the upper portion 202 of the inside wall of the temple element and the upper portion 232 of the outside wall of the temple element is a latch 242. Similarly, inside the opening 230, positioned between the lower portion 204 of the inside wall of the temple element and the lower portion 234 of the outside wall of the temple element is latch 244.

Figure 4A:
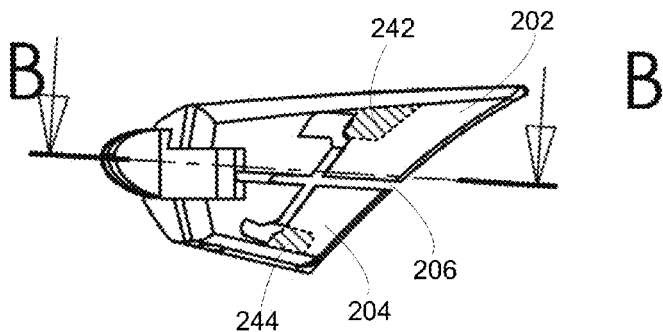
FIG. 4A illustrates an inside side view of a hinge element incorporating one embodiment of the lock and including a view of the hidden latches on the interior of the lock.
Figure 4B:
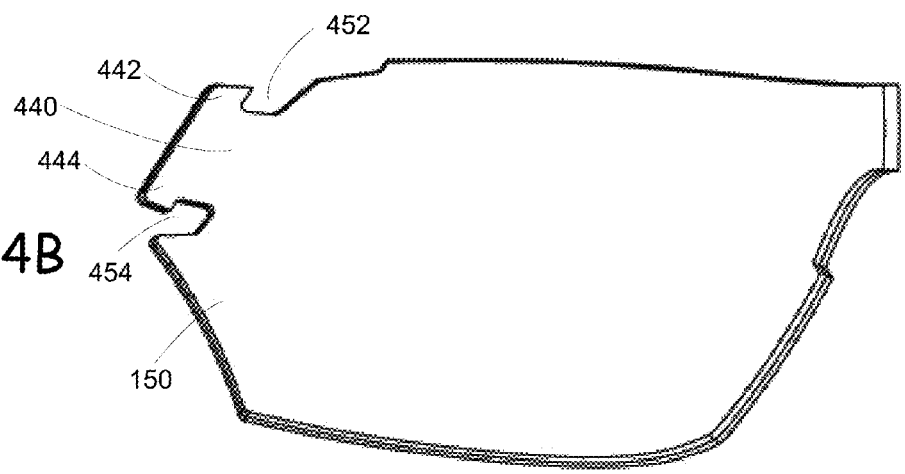
FIG. 4B is a view showing the outline of an exemplary lens.
Figure 4C:
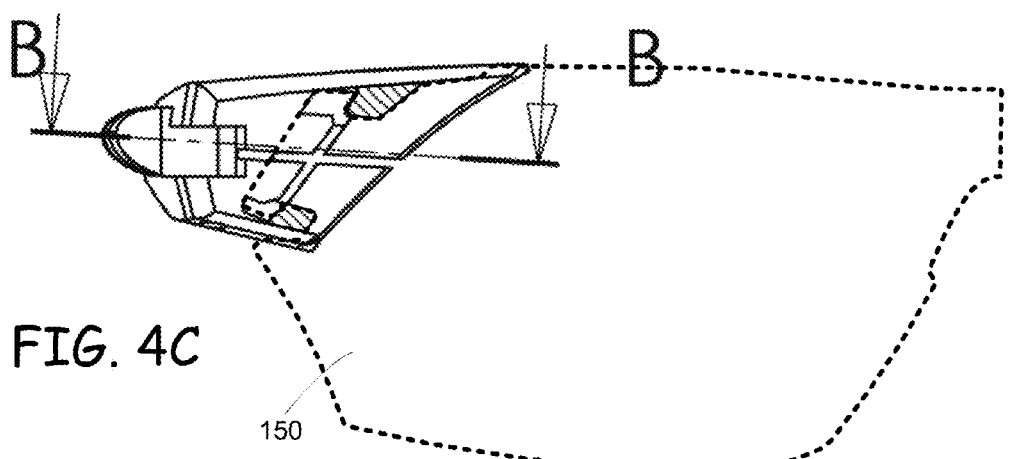
FIG. 4C illustrates a hinge element with a lens installed within the lock.
Figure 4D:
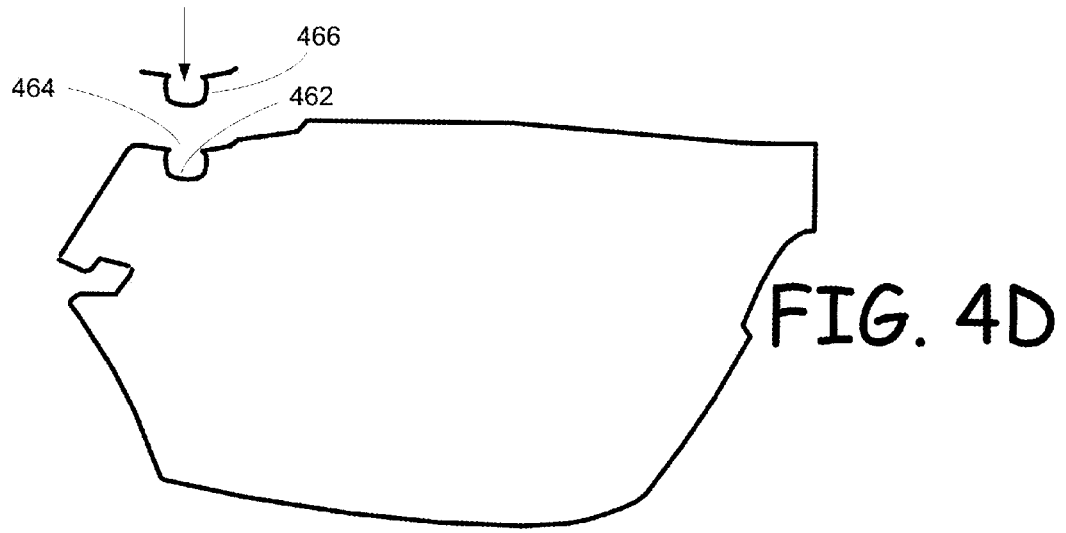
FIG. 4D illustrates a snap-like configuration for a latch and detent and FIG. 4E illustrates a lens that includes an attachable connector.
Figure 4E:
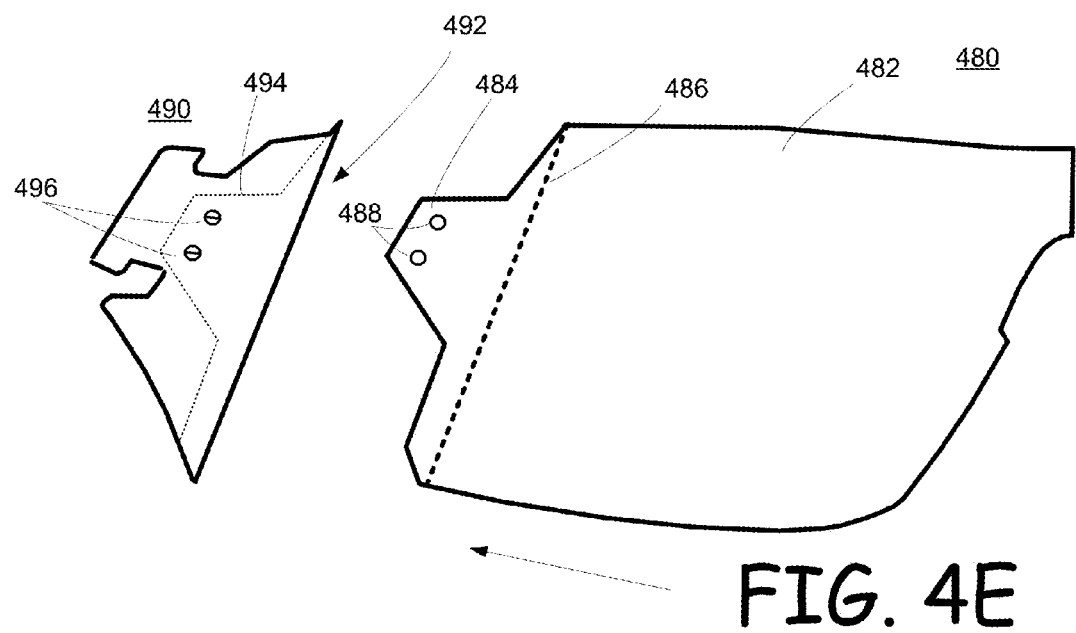
Figure 4F:
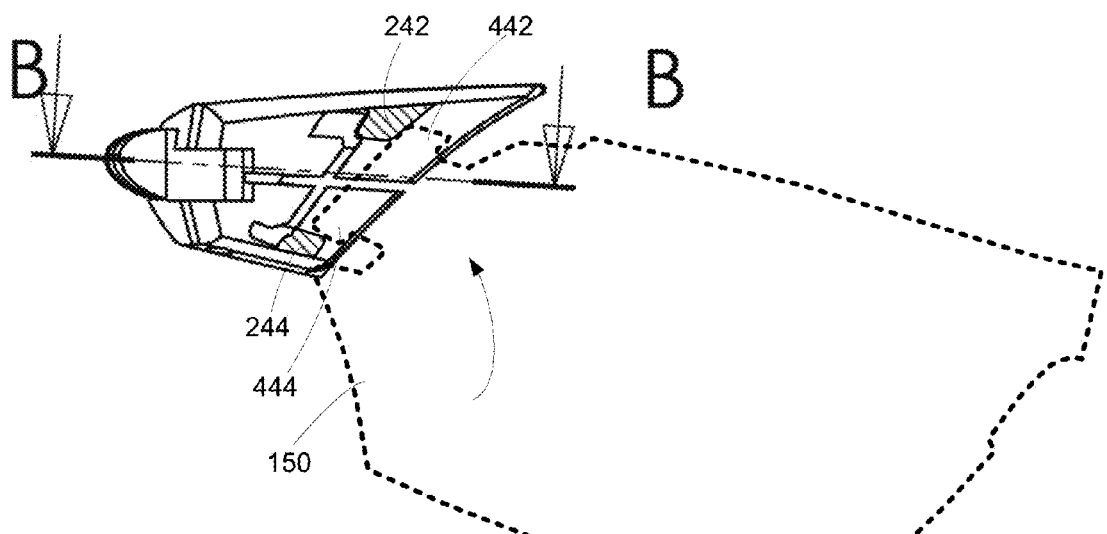
FIG. 4F illustrates an interim step of installing a lens into a lock.
Figure 4G:
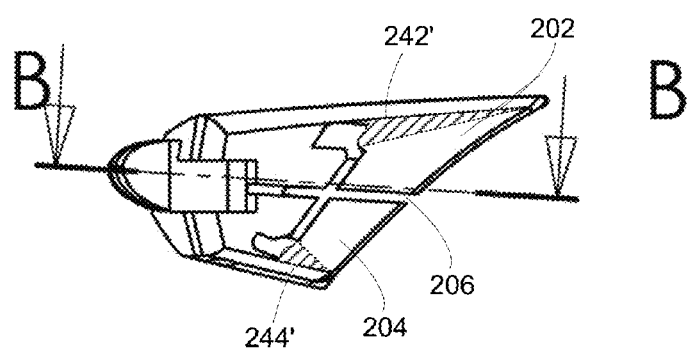
FIG. 4G shows another exemplary embodiment in which the latches 242' and 244' are shown as being ramped to further facilitate installation of the lens.

FIG. 4A illustrates the temple element of FIG. 2A with one exemplar embodiment of the latches 242 and 244 being shown. The latches 242 and 244 are shown with dotted outlines and hash shading. FIG. 4G shows another exemplary embodiment in which the latches 242' and 244' are shown as being ramped to further facilitate installation of the lens element. FIG. 4B is a view showing the outline or shape of an exemplary lens element 150. The lens element 150 is shown as including a "T" shaped connecting element with an upper flange 442 and a lower flange 444 that extend in opposing directions from a stem 440 extending from the main body of the lens. However, it should be appreciated that relative positioning of the flanges and stem may take on a variety of other shapes such as an umbrella, a "Y", etc. as non-limiting examples. The upper flange 442 and the upper portion of the lens element 150 define a detent 452 that is similarly shaped to the lower portion of the latch 242. Further, the lower flange 444 and the lower portion of the lens element 150 define a detent 454 that is similarly shaped to the upper portion of the latch 244.

In operation, the lens element 150 is inserted into the receptor lock by sliding the latch 444 through the opening 230 and towards the backside of the latch 244. When the lens element is thus inserted into the receptor lock, the lens element is angled downward such that the catch 442 is in front of the latch 242 as shown in FIG. 4F. The angle of the lens 150 can then be decreased by applying pressure to force the catch 442 against the latch 242, thereby causing the upper portion 202 to move away from the lower portion 204 as the width of the slot 206 increases. The force may also cause the slot 208 to widen as the upper portion is flexed a sufficient amount to allow the catch 442 to pass below the latch 242 such that the latch 242 can then slide into the detent 452 thereby returning the lock to its steady or resting state. FIG. 4C depicts the lens element 150 as being fully inserted into the receptor lock with the latch 242 resting in the detent 452 and the latch 244 resting in the detent 454.

The material utilized to construct the temple element or receptor is a flexible and resilient plastic, composite or other material that will retain the memory of its steady state and return to such state upon the removal of the forces causing the upper portion 202 and the lower portion 204 to move away from each other. A few non-limiting examples of such materials include polycarbonates, glass, plastic, zylonite, metals, alloys, composites, etc. In some embodiments, the material used to construct the temple element is softer or more malleable than the material used to construct the lens element. In other embodiments, the softness, rigidity and malleability of the materials is not relevant because the kerf-like slots create any required flexibility in the hinge element.

To remove the lens element 150 from the receptor lock, the lens element 150 can be forced in the direction 222 (see FIG. 2A), thereby causing the catch 442 to apply force to the latch 244 and force the upper portion 202 to move away from the lower portion 204. An individual may also apply direct force to the upper portion 202 to help facilitate the removal of the lens element by causing the upper portion 202 to move further away from the lower portion 204. Once the latch 244 vacates the detent 452, the catch 444 can be lifted upwards and away from the temple element thereby causing the latch 244 to vacate the detent 454 and catch 444 to slide from behind the latch 244. The upper portion 202 and lower portion 204, upon removal of any applied forces, then returns to its steady state condition.

It should also be appreciated that the lens element can be attached to the receptor lock by first inserting the catch 442 through the opening 230 such that the latch 242 settles within or proximate to the detent 452 and then applying a downward-lateral force to cause the catch 444 to displace the lower portion 204 of the receptor lock 200 relative to the upper portion 202 as the catch 444 slides over the latch 244. Further, a user may simply apply opposing forces to the upper portion 202 and lower portion 204 to force the opening 230 to widen and then simply slide the catches 442 and 444 past the latches 242 and 244 respectively. Upon releasing of the opposing forces, the latches 442 and 444 would settle into the detents 452 and 454 respectively.

It should be appreciated that the illustrated configuration in FIGS. 4A-4C is a non-limiting example of one embodiment that incorporates or utilizes the receptor lock. Other variations may also be included in which the particular shapes, sizes, orientations, etc. of the lens element, the latches, the catches and the detents are modified. As non-limiting examples, the latches can be more rounded to help facilitate the entry of the lens into the receptor lock. Further, the detents can be more pronounced by deepening and/or widening the detents, or the detents can be configured to be more shallow and/or narrow. Likewise, the size of the latches can be modified accordingly to ensure a tighter fit with the detents.

In the illustrated embodiment, the latches 242 and 244 are offset from the edge of the lens side edge of the hinge lock (i.e., set back into the interior of the void). Advantageously, this offset allows the catches of the lens element, as well as a portion of the lens element, to be inserted within the hinge lock and thus provides a more secure and stable interface with minimal wobble.

Further, in some embodiments, the gap 236 may be reduced to provide further structural support to the lens element by extending the surface area of the receptor lock that covers and comes in contact with the lens element. In addition, the size of the gap 260 between the inner surfaces of the inside side and outside side of the receptor lock can be configured to snuggly fit the width of the lens element. This gap 260 houses the latches 242 and 244 and receives the lens element between the inner surfaces. Thus, if the width of the gap 260 is configured to be slightly smaller than the width of the lens element at steady state, then once the lens element is installed in the receptor lock, the inner surfaces of the gap 260 will apply pressure to the surface of the lens element and thus provide frictional support for holding the lens element in position. Further, in some embodiments the inner surface of the gap 260 and/or the surfaces of the catches of the lens and the edges of the detents can be structured to provide additional frictional support by including ridges, roughened surfaces, or the like.

It will be appreciated that in the illustrated exemplary embodiment, the detent 454 is illustrated as being a "snap-like" structure in that the opening into the detent 454 is slightly smaller than the largest diameter of the detent 454 and the diameter of the latch 244 that is inserted into the detent 454. Thus, an amount of pressure is required to force the catch 244 into the detent 454. Other configurations of this "snap-like" feature may be employed for both the upper detent 452 and/or the lower detent 454. FIG. 4D illustrates a non-limiting example of an alternative approach from providing a "snap-like" structure. In the illustrated embodiment, the detent 462 is substantially rounded with the opening 464 being slightly less than the largest width of the rounded detent 462. The latch 466 is shown as being similarly shaped as the detent 462 and the dimensions of the latch 466 is approximately equal to the interior dimensions of the detent 462. Thus, in operation, the latch 466 can be forced through the opening 464 and into the detent 462 thereby creating a snap-like attachment. It will be appreciated that the material used to create the latch may include elastic properties allowing the latch 466 to be compressed during entry into the detent 462 but then quickly returning to its normal, steady state shape or non-compressed state once entered into the detent 462. In typical embodiments, the lens element is constructed of a polycarbonate material and is thus rather rigid. However, in other embodiments, the material used to fabricate the lens, or at least the portion of the lens being inserted into the receptor lock may likewise or alternatively include elastic properties thereby allowing it to be deformed during assembly and then return to its steady state.

In some embodiments, the lens element may include the components of an eye lens, and a connecting portion. In the embodiments illustrated thus far, the lens element has been shown as a unitary piece including either a single lens or a lens that encompasses both eyes. However, in some embodiments the lens element may include an attachable connector that can either be fixedly attached to the lens or attachable and removable from the lens. FIG. 4E illustrates a lens that includes an attachable connector. In the illustrated embodiment, the lens 480 includes a lens portion 482 that is intended to be positioned over a wearer's eyes, and then an extended portion 484. Further the illustrated embodiment depicts a connector 490 that includes an opening 492 and the catch structure as depicted in FIG. 4B and described in conjunction with the description of FIG. 4B. In operation, the lens 480 can be adjoined to the connector 490 by sliding the extended portion 484 of the lens through the opening 492 until the connector 490 fits snuggly over the lens 480 and the connector 490 rests along the area depicted by broken line 486 and the extended portion 484 of the lens 480 penetrates to the position depicted by broken line 494. In some embodiments the lens 480 can then be permanently secured to the connector 490 such as by glue, heat weld, etc. In other embodiments, as depicted in FIG. 4E the lens 480 can be removeably attached to the connector 490 by various means, such as screws 496 being inserted through the connector 490, through the lens holes 488 and screwed into the back side of the hinge lock or a nut. This latter embodiment advantageously enables the lens to be repaired if damage to the connector component of the lens is incurred due to excessive wear or otherwise, or if the lens is scratched. Such embodiments allow the lens or connector to be replaced independently. In addition, rather than the connector 490 defining an interior for receiving the extended portion 484 of the lens, the connector may simply mount to the surface of the lens. In addition, the surface of the connector 490 may include a recessed area for receiving the lens. It will be appreciated that the connector 490, although illustrated as an independent piece, may also be configured to be integral to a frame of the glasses, such as being configured as a full frame or half frame. Such embodiments are further illustrated in connection with FIG. 7A and FIG. 7B, FIG. 8A and FIG. 8B.

Figure 5A:
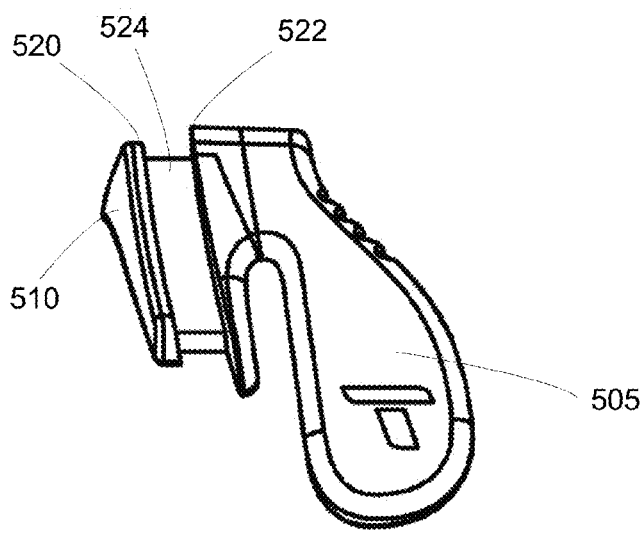
FIG. 5 presents various views of an exemplary bridge that can be attached to a lens or lenses with FIG. 5A being a side view of the exemplary bridge showing a nose pad and a lens edge holder, FIG. 5B being a topside view of the exemplary bridge illustrated in FIG. 5A and FIG. 5C being a front side view of the bridge illustrated in FIG. 5A.
Figure 5B:
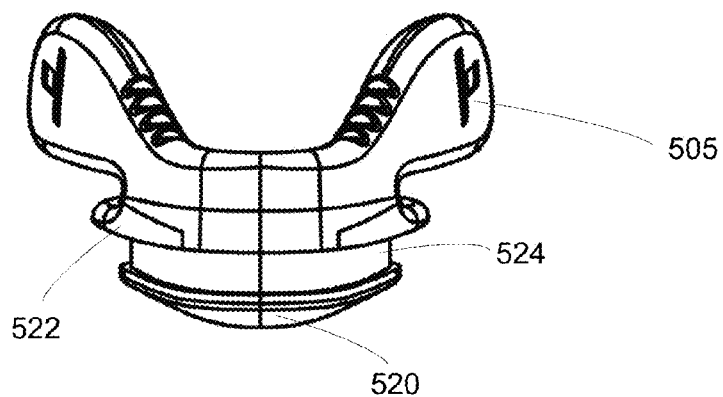
Figure 5C:
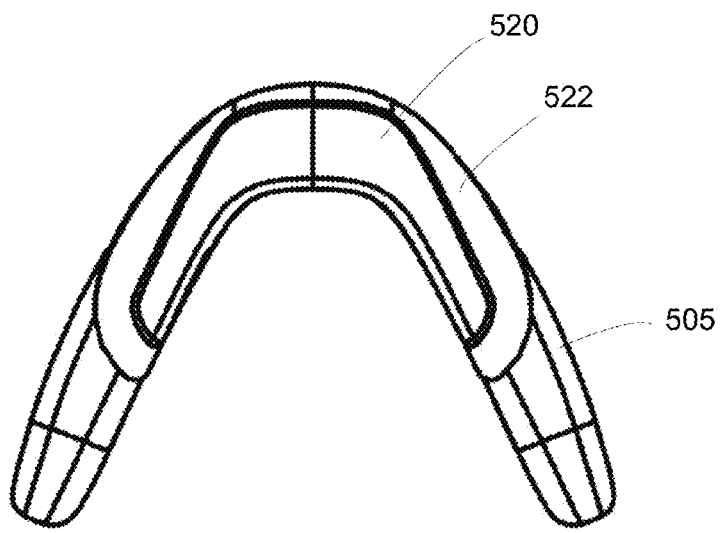

In various embodiments, the lens element 150 may be a unitary lens that extends over both eyes or, may include two separate lenses, one for the left 150L and one for the right 150R. FIG. 5 presents various views of an exemplary bridge 122 that can be attached to lens element 150 or lenses 150L and 150R. FIG. 5A is a side view of the exemplary bridge 112 and includes a nose pad 505 and a lens edge holder portion 510. FIG. 5B is a topside view of the exemplary bridge illustrated in FIG. 5A. FIG. 5C is a front side view of the bridge illustrated in FIG. 5A. The lens edge holder portion 510 includes a forward flange 520 and a rear flange 522 that define a lens edge channel 524 that is configured to receive and hold the lens element 150. In one embodiment, the forward flange 520 and the rear flange 522 may be configured such that the bridge 122 is frictionally secured and held to the lens element 150 when placed therein. In other embodiments, other mechanisms may be utilized to secure the lens element 150 to the bridge 122. For instance, the lens element 150 may include one or more detents and the forward flange 520 and/or the rear flange 522 may include one or more protrusions corresponding to the detents and thereby securing the lens 150 to the bridge 122. In other embodiments, a lock structure similar to that employed in the temple element may also be included in the bridge 122 and lens element 150 interface. Thus, in a dual lens embodiment, each lens may include a connecting end for the temple element and one for the bridge.

FIG. 6A is a top plan view of an exemplary ear stem 114 attached to an exemplary temple lock structure 120. FIG. 6B is a side elevation view of the exemplary ear stem 114 attached to the exemplary temple lock structure 120. In the illustrated embodiment, the ear stem 114 attaches to the temple lock 120 at point 610. The mechanism for attaching the ear stem 114 to the temple lock 120 can vary from embodiment to embodiment and those skilled in the art will be familiar with the various types of connections including hinged, pinned, fixed, etc.

In the illustrated embodiments, the lens connector has been shown as being on the side or end of the lens element and interfacing with the temple element. However, it will be appreciated that the lens connector may also be positioned at other locations around the perimeter of the lens element. For instance, in an embodiment including a rim, the lens element may include the connector element and the rim may incorporate the receptor element. Thus, in an embodiment with an upper rim, the top of the lens element may include the lens connector and the underside of the upper rim may include a receptor. The lens element can then be installed into the upper rim. Similarly, for embodiments having a lower rim, the lens connector can be on the bottom edge of the lens and interface to the lower rim. Thus, the lens connector can actually be located anywhere around the perimeter of the lens as long as it corresponds to a receptor.

The latches and detents have been described such that the catches of the lens connector slides past the latches, thereby displacing the receptor and allowing the latches to settle into the detents. In other embodiments, one of the detents may be replaced by a hole or aperture. In such embodiments, the receptor can be opened to receive the lens connector thereby allowing a latch to be placed through the aperture and then, the lens can be slid into the locking position as previously described. In yet another embodiment, the detents can be replaced by apertures and, when the receptor is forced open, the latches can be slid through the apertures. When the receptor is closed again, the walls of the receptor and the catches hold the lens in position.

FIG. 4H illustrates another variation that can be included in other embodiments including a relief mechanism on a lens. In the illustrated embodiment, a relief mechanism is included in the lens to allow the catches to have some level of flexibility to further facilitate entry into the receptor. It should be appreciated that such an embodiment could be used along with the relief mechanism in the receptor or in lieu thereof. The illustrated relief is oval shaped and constructed of round edges to facilitate use with polycarbonate type lenses. However, in other configurations, including the kerf-like structures illustrated or presented in FIG. 3A-3H as well as others may also be used. Further, utilizing a material for the lens that is more flexible than polycarbonate can also be deployed in various embodiments.

FIG. 4I also illustrates the incorporation of a relief mechanism into a two-piece lens element structure in which the lens connector can be attached to the lens. In the illustrated embodiment, the attachable lens connector can include the relief mechanism as illustrated in FIG. 4H, FIGS. 3A-3H as well as others. Advantageously, in this embodiment, polycarbonate lenses can still be used and the lens connector can be constructed out of a more flexible material.

As illustrated in FIG. 4I, the lens connector can be separate from the lens and, such feature may take on a wide variety of embodiments. An advantage of this feature is that the temple elements and the ear stems can then receive any of a wide variety of lens elements such as the lens elements previously disclosed, as well as a wide variety of other lens elements structured as lenses that include the connector element, lenses that have the connector element attached to them, and/or lenses that cooperate with another device, such as a frame of the glasses, to create the connector element.

Figure 7A:
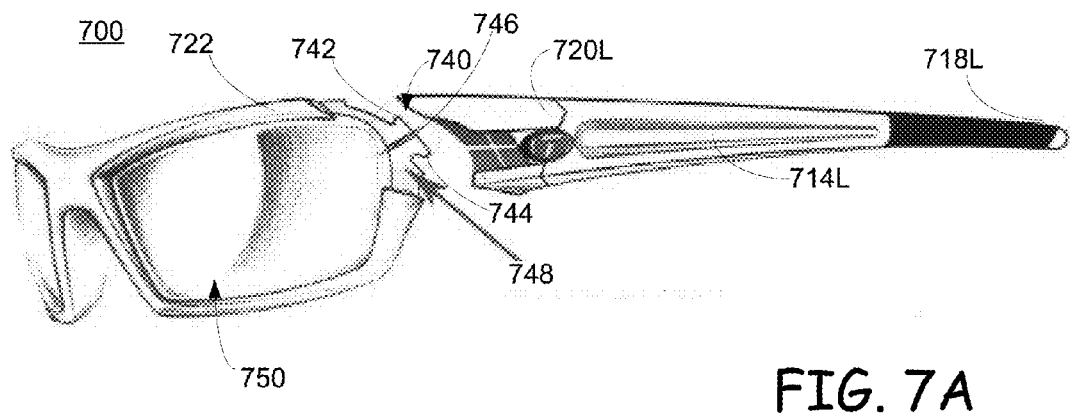
FIG. 7A and FIG. 7B illustrate a full-framed pair of glasses that incorporates attachable capabilities of the various embodiments.
Figure 7B:
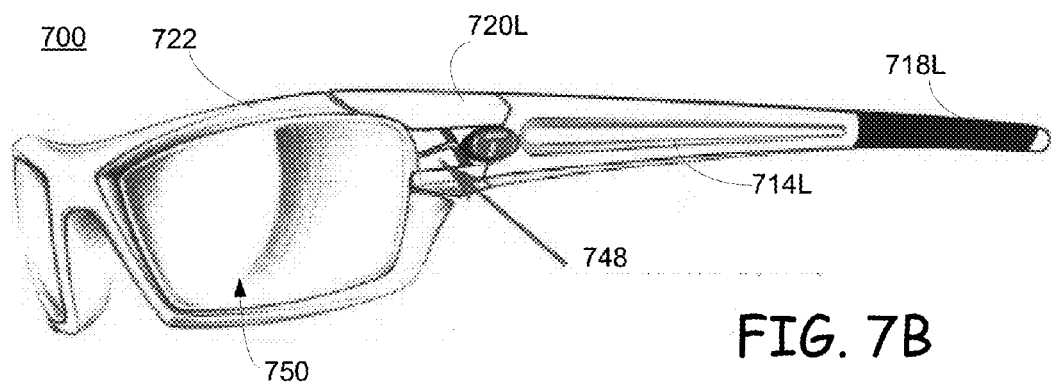

FIG. 7A and FIG. 7B illustrate a full-framed pair of glasses that incorporates attachable capabilities of the various embodiments. The full-frame embodiment of the feature illustrated in FIG. 4I includes a lens element that is used in conjunction with an attachable lens connector incorporated into the frame of the glasses. In the illustrated embodiment, the full-framed pair of glasses 700 includes a lens element and a frame 722. In the illustrated embodiment, the frame 722 defines the connector element for insertion into the temple 720L. In the illustrated embodiment, the frame 722 has a cut-away portion 748 on the front side of the lens 750 and proximate to the interface with the temple element 720L. The back-side of the frame at this area includes the connecting element 740 with upper latch 742 and lower latch 744. It should be appreciated that in this embodiment, the lens is inserted into the frame, and is held in place by being resident within a grove or channel formed by the frame 722. In addition, the illustrated frame includes a kerf-like element or groove 746 extending through the connector element 740. The kerf-like groove 746 can operate to provide compression of the connector element 740 when the connector element 740 is being inserted into the temple element 720L. The frame 722 can be structured of a material that allows the frame to be slighting bent under pressure, thereby allowing the upper latch 742 and lower latch 744 to be inserted into the connectors within the temple 720L. The resiliency of the material causes the frame 722 to revert to a steady state once the application of pressure is removed. Further, the kerf-like groove 746 may also allow the frame 722 to expand. For instance, by applying outward pressure in opposing direction on the upper latch 742 and the lower latch 744, the kerf-like groove 746 can be enlarged. In this state, the user can more readily and easily insert the lens into the frame 722. The cut-out area 748 of the frame 722 is shown as being configured to receive the temple element 720L as best illustrated in FIG. 7B of the fully assembled glasses. In embodiments with this configuration, the temple 720L may or may not include the kerfs for easing the insertion of the connector element integral to the frame. Further, although the connector is shown as being on the backside of the frame 772, it will be appreciated that the connector may alternatively be integral to the front of the frame 722, both the front and back of the frame and even a combination of both.

Figure 8A:
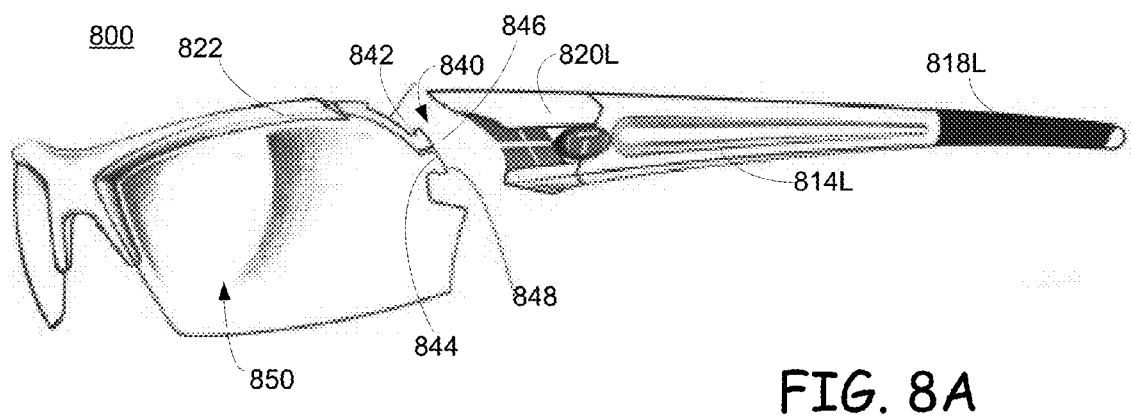
FIG. 8A and FIG. 8B illustrate a half-frame pair of glasses that incorporates attachable capabilities of the various embodiments.
Figure 8B:
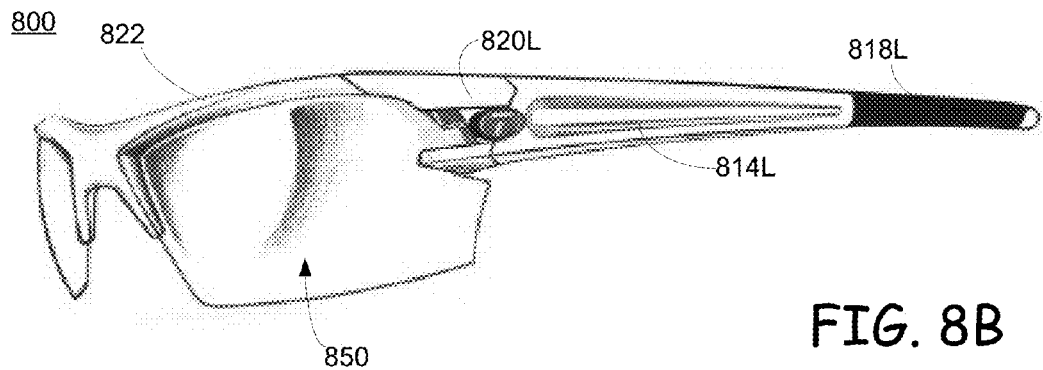

FIG. 8A and FIG. 8B illustrate a half-frame pair of glasses that incorporates attachable capabilities of the various embodiments. The half-frame embodiment of the feature illustrated in FIG. 4I includes a lens element that is used in conjunction with an attachable lens connector incorporated into the frame of the glasses and the lens in concert. In the illustrated embodiment, the half-frame glasses 800 includes a frame 822 and a lens 850. The front portion of the frame 822 has cut-away portion 848 and the back portion of the frame defines the upper latch 842 of the connector 840. The lens 850 defines the lower latch 844 of the connector 840. A gap or groove 846 is defined between the upper latch 842 and the lower latch 844. Similar to the embodiment in FIG. 7A and FIG. 7B, this groove allows the connector 840 to be compressed for inserting into the temple area 820L.

Although the illustrated embodiment shows the half frame as being associated with the top edge of the lens 850, in some embodiments, the half frame may be located on the bottom edge of the lens, or as illustrated best in FIG. 4I, the frame may be only a side portion frame.

Figure 9A:
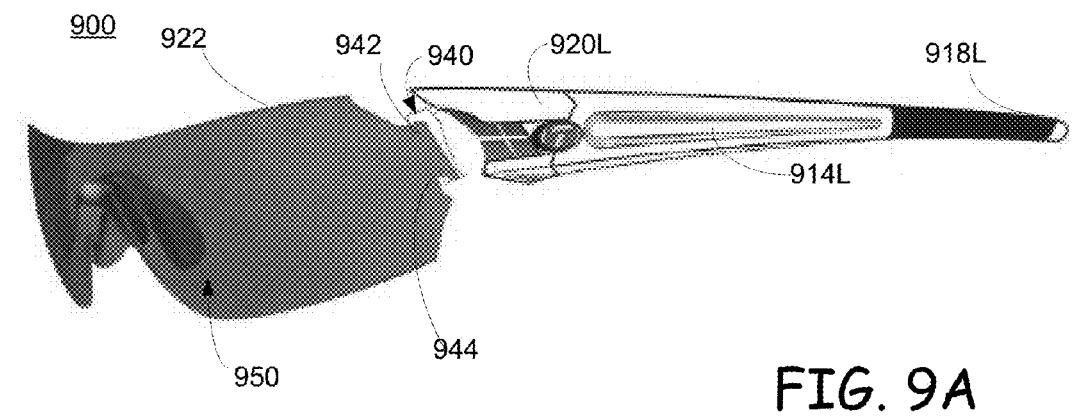
FIG. 9A and FIG. 9B illustrate a frameless embodiment in which the connector is incorporated solely into the lens element and, a single lens embodiment or shield is illustrated.
Figure 9B:
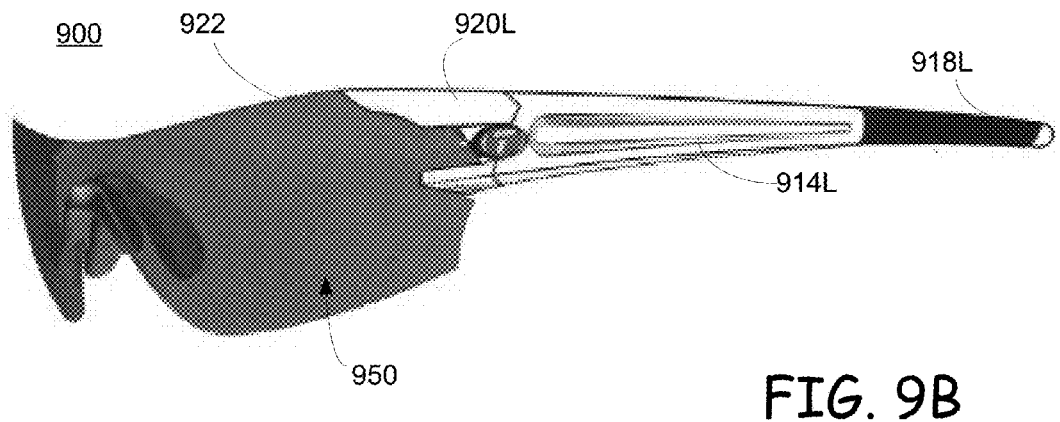

FIG. 9A and FIG. 9B illustrate a frameless embodiment in which the connector is incorporated solely into the lens element and, a single lens embodiment or shield is illustrated. In the illustrated embodiment, the glasses 900 include a lens or shield 950 that defines a connector 940. The upper latch 942 and lower latch 944 of the connector 940 are fully defined by the lens 950. The connector 940 of the lens 950 is inserted into the temple 920L of the stem (920L, 914L and 918L) as previously described. In the illustrated embodiment, the connector of the lens element 950 does not include any kerfs or grooves to facilitate entrance of the connector into the temple 920L. However, in some embodiments such a groove may be included. It will also be appreciated that the structure illustrated in FIG. 4I, as well as the other structures illustrated herein may be used in this configuration.

FIG. 10A, FIG. 10B and FIG. 10C illustrate yet another embodiment of glasses that incorporate the attachable capabilities. In the illustrated embodiment, glasses 1000 includes a frame 1022 and lenses 1050. The frame 1022 defines a rim that extends at least partially around the perimeter of a lens 1050 and secures the lens in position. For instance, the frame 1022 may include a groove or channel 1024 into which the edge 1052 of the lens 1050 can rest to secure it in position. In the illustrated embodiment, similar to the embodiment illustrated in FIG. 7A and FIG. 7B, one side of the frame 1022 that coincides with the lens 1050 is cut out 1048 thus exposing the edge of the lens 1050. In the illustrated embodiment, the cut out 1048 is larger than the cut out in FIG. 7A. The larger cut out 1048 enables a lens 1050 to be maneuvered into the frame 1022 and secured in place without having to have a kerf-like slot extending through the edge of the frame. The connector on the temple portion 1020L is thus extended to fill in more of the space or cut out 1048. The temple portion 1020L can completely fill in the cut out area 1048 or partially thus leaving a gap 1048A and/or 1048B between the frame 1022 and temple 1020L.

The frame 1022 defines the connector element 1040, which includes the upper latch 1042 and the lower latch 1044. The temple 1020L can be attached to the connector element 1040 as previously described thus securing the glasses 1000 into a unitary piece.

FIG. 11A-FIG. 11E illustrate various views of yet another embodiment of glasses that incorporate the attachable capabilities. FIG. 11A is a front elevation view of the glasses 1100 that include the lenses 1150 and a frame 1122. FIG. 11B is a side elevation view of the glasses 1100. FIG. 11C is a perspective view of the glasses 1100 taken from an underside view. FIG. 11D is a perspective view of the glasses 1100 taken from a front-side view. FIG. 11E is a top plan view of the sunglasses 1100. In this embodiment, the cut away 1148 area that allows the lens 1150 to be more easily inserted into the frame 1122 is smaller than the cut away 1048 illustrated in FIG. 10A and FIG. 10B.

Looking at FIGS. 11C and 11D, a gap 1148 between the temple 1120 and the frame 1122 is shown on the outside front of the glasses whereas on the inside front, there is no gap at the connection point 1149 between the frame 1122 and the temple 1120.

FIG. 11F provides several views of a close-up of the temple 1120 and the interface with the connector element 1140. As in the previously described embodiments, the connector element 1140 includes an upper latch 1142 and a lower latch 1144. In the embodiment illustrated in FIG. 11F, the connector element wraps around the corner of the frame 1122 rather than being a substantially "T" shaped connector. Thus, it should be appreciated that the connector element 1140 may take on a variety of such different forms without departing from the scope of the invention.

In FIG. 11E, the illustrated embodiment is shown as including measurements between the top of the stems of 97.7 mm, and from temple to temple of 131.8 mm. Further, the length of the glasses 1100 from front to tips is illustrated as being 166 mm. As illustrated in FIG. 11A, the height of the glasses 1100 is shown as being 43.6 mm. It should be appreciated that the provided measurements are simply a non-limiting example of the structure of one embodiment and that many variations as well as different ratios between the various measurements are anticipated.

In some embodiments, a glasses kit can be sold that may include two stems (i.e., the temple, ear stem and tip) and then two or more lens element configurations. As a non-limiting example, one kit may include a full frame with lenses (FIG. 7A and FIG. 7B) as well as a shield (FIG. 9A and FIG. 9B). Another kit may include a half frame with lenses (FIG. 8A and FIG. 8B) and a shield (FIG. 9A and FIG. 9B). The kit may also include two or more of any combination of the described lens elements as well as others. Advantageously, the user can obtain the equivalent of several pair of glasses for different purposes in a single kit and, be able to easily and quickly transform the glasses for different purposes. For instance, the user may have the shield installed for a bike ride but, once at the user's desired destination, the user could configure the glasses with a full-frame pair of reading glasses.

The kit enables a wide variety of configurations. For instance, in one embodiment the kit may include shatter proof, puncture resistant OSHA qualified shield for eye protection but, once the user leaves a job site requiring such protection, the user can slide his or her sunglasses into the frame and/or temples. In another embodiment, a theater may include 3D lenses to be inserted into the frame for complimentary handouts for a movie and then, allow the user's to purchase one or more types of replacement lenses to go along with the stems. In another embodiment, an ophthalmologist may offer a kit that includes prescription sunglass lenses and regular lenses. In addition, the ophthalmologist can allow the patient to utilize one prescription for a while and if the patient wants a stronger or weaker prescription, the patient can easily swap out the lenses for a different prescription.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb. Further, the term pairs upper and lower, proximate and distal, forward and rear, inside and outside and other relative terms are provided solely for the purpose of describing the relationship between certain surfaces and elements and do not operate to limit the particular embodiment as the various elements, surfaces, etc. can be positioned, either by changing the view of the embodiment or the location of the various elements, surfaces, etc, such that the selected terms are not spatially correct but are still maintain the same relative positions.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. Glasses including stems and one or more lens elements that can be attached to the stems and detached from the stems, the glasses comprising:
    a temple element in each of the stems, the temple element including a lens element interface;
    a lens element that includes a connector;
    wherein the temple element includes a first wall and a second wall that cooperatively define an interior space and an opening into the interior space, the interior space configured to receive the lens element connector, the temple element including at least one relief mechanism in at least the first wall or second wall that enables the displacement of at least portions of such wall to increase the size of the opening into the interior space, and wherein the interior space includes at least two latches;
    wherein the connector of the lens element includes at least two catches with each catch corresponding to one of the at least two latches, and at least one detent associated with a second catch; and
    wherein pressure can be applied to the lens element to force the lens element into the temple element.

2. The glasses of claim 1, wherein the lens element includes a frame which holds a lens.

3. The glasses of claim 2, wherein the frame at least partially defines the connector.

4. The glasses of claim 1, wherein the lens element includes a full-frame which surrounds the perimeter of a lens and holds the lens in place.

5. The glasses of claim 4, wherein the connector is defined by the full-frame.

6. The glasses of claim 1, wherein the lens element includes a full-frame which includes a front and a back, the front and the back defining a channel there between into which the lens can be inserted and held in place and, one of the front or back of the frame defines a void such that the frame does not define a channel over the length of the void.

7. The glasses of claim 6, wherein the other of the front or the back of the frame defines the connector along the length of the void and, wherein the void allows the lens to be inserted into the frame.

8. The glasses of claim 1, wherein the lens element includes a half-frame which attaches to a lens.

9. The glasses of claim 8, wherein the connector is defined by the half-frame and the lens.

10. The glasses of claim 8, wherein the connector is defined by the half-frame.

11. Glasses including stems and one or more lens elements that can be attached to the stems and detached from the stems, the glasses comprising:
    a temple element in each of the stems, the temple element including a lens element interface;
    a lens element that includes a connector;
    wherein the temple element includes a first wall and a second wall that cooperatively define an interior space and an opening into the interior space, the interior space configured to receive the lens element connector, the temple element including at least one relief mechanism in at least the first wall or second wall that enables the displacement of at least portions of such wall to increase the size of the opening into the interior space, and wherein the interior space includes at least two latches;
    wherein the connector of the lens element includes at least two catches with each catch corresponding to one of the at least two latches, and at least one detent associated with a second catch; and
    wherein pressure can be applied to the lens element to force the lens element into the temple element, wherein the lens element includes a full-frame which surrounds the perimeter of a lens and holds the lens in place, and wherein the connector includes a slot that runs from the edge of the connector and through the frame such that the frame can be forced open for receiving of the lens.

12. The glasses of claim 11, wherein the slot further allows the frame to be compressed when forcing the lens element into the temple element.

13. The glasses of claim 11, wherein the temple element includes a kerf-like lateral slot that begins at the edge of the lens interface of the at least one wall and extends towards the opposing end of the temple element.

14. The glasses of claim 13, wherein the temple element further includes a vertical slot that is substantially perpendicular to the lateral slot and that intersects with the lateral slot.

15. The glasses of claim 14, wherein on at least one end of the vertical slot, the wall defines a void that is substantially wider than that vertical slot.

16. Glasses including stems and one or more lens elements that can be attached to the stems and detached from the stems, the glasses comprising:
    a temple element in each of the stems, the temple element including a lens element interface;
    a lens element that includes a connector;
    wherein the temple element includes a first wall and a second wall that cooperatively define an interior space and an opening into the interior space, the interior space configured to receive the lens element connector, the temple element including at least one relief mechanism in at least the first wall or second wall that enables the displacement of at least portions of such wall to increase the size of the opening into the interior space, and wherein the interior space includes at least two latches;

wherein the connector of the lens element includes at least two catches with each catch corresponding to one of the at least two latches, and at least one detent associated with a second catch; and wherein pressure can be applied to the lens element to force the lens element into the temple element, wherein the lens element includes a half-frame which attaches to a lens, wherein the connector is defined by the half-frame and the lens and wherein the temple element includes a kerf-like lateral slot that begins at the edge of the lens interface of the at least one wall and extends towards the opposing end of the temple element.

17. The glasses of claim 16, wherein the temple element further includes a vertical slot that is substantially perpendicular to the lateral slot and that intersects with the lateral slot.

18. The glasses of claim 17 wherein on at least one end of the vertical slot, the wall defines a void that is substantially wider than that vertical slot.

19. A glasses kit with interchangeable lens elements comprising:
   two stems, each stem including a temple element for receiving a connector of a lens element, the temple elements including at least one wall;
   the kit comprising at least two of: a full-frame lens element wherein the connector is defined by the frame of the full-frame lens element, a half-frame lens element wherein the connector is defined at least partially by the half-frame and at least partially by the lens, a half-frame lens element wherein the connector is defined by the half-frame and, a frameless lens element wherein the connector is defined by the lens;
   wherein the temple element includes a kerf-like lateral slot that begins at the edge of the lens interface of the at least one wall and extends towards the opposing end of the temple element, wherein the temple element further includes a vertical slot that is substantially perpendicular to the kerf-like lateral slot and that intersects with the lateral slot and wherein on at least one end of the vertical slot, the wall defines a void that is substantially wider than that vertical slot.

20. Glasses including stems and one or more lens elements that can be attached to the stems and detached from the stems, the glasses comprising:
   a temple element in each of the stems, the temple element including a lens element interface;
   a lens element that includes a connector;
   wherein the temple element includes at least a first wall and optionally a second wall that cooperatively define an interior space and an opening into the interior space, the interior space configured to receive the lens element connector, the temple element including at least one relief mechanism in at least the first wall or optional second wall that enables the displacement of at least portions of such wall to increase the size of the opening into the interior space, and wherein the interior space interfaces with the connector;
   wherein pressure can be applied to the lens element to force the lens element into the temple element, wherein the lens element includes a half-frame which attaches to a lens, wherein the connector is defined by the half-frame and wherein the temple element includes a kerf-like lateral slot that begins at the edge of the lens interface of the at least one wall and extends towards the opposing end of the temple element.

21. Glasses including stems and one or more lens elements that can be attached to the stems and detached from the stems, the glasses comprising:
   a temple element in each of the stems, the temple element including a lens element interface;
   a lens element that includes a connector;
   wherein the temple element includes at least a first wall and optionally a second wall that cooperatively define an interior space and an opening into the interior space, the interior space configured to receive the lens element connector, the temple element including at least one relief mechanism in at least the first wall or optional second wall that enables the displacement of at least portions of such wall to increase the size of the opening into the interior space, and wherein the interior space interfaces with the connector; and
   wherein pressure can be applied to the lens element to force the lens element into the temple element, wherein the lens element is frameless, wherein the connector is defined by the lens and wherein the temple element includes a kerf-like lateral slot that begins at the edge of the lens interface of the at least one wall and extends towards the opposing end of the temple element.

22. Glasses including stems and one or more lens elements that can be attached to the stems and detached from the stems, the glasses comprising:
   a temple element in each of the stems, the temple element including a lens element interface;
   a lens element that includes a connector;
   wherein the temple element includes a first wall and optionally a second wall that cooperatively define an interior space and an opening into the interior space, the interior space configured to receive the lens element connector, the temple element including at least one relief mechanism in at least the first wall or optional second wall that enables the displacement of at least portions of such wall to increase the size of the opening into the interior space, and wherein the interior space for receiving the lens element connector;
   wherein pressure can be applied to the lens element to force the lens element connector into the temple element such that the lens element connector corresponds with the interior space of the temple element, wherein the lens element includes a full-frame which surrounds the perimeter of a lens and holds the lens in place, wherein the connector is defined by the full-frame and wherein the lens connector includes a slot that runs from the edge of the connector and through the frame such that the frame can be forced open for receiving of the lens.

* * * * *